United States Patent
Carney et al.

(10) Patent No.: US 6,489,410 B1
(45) Date of Patent: Dec. 3, 2002

(54) SUPPORTED CATALYST COMPOSITION FOR POLYMERIZATION OF OLEFINS

(75) Inventors: Michael John Carney, Eldersburg, MD (US); David George Ward, Laurel, MD (US)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 08/476,186

(22) Filed: Jun. 7, 1995

(51) Int. Cl.$^7$ .................................................. C08F 4/18
(52) U.S. Cl. .................... 526/107; 526/129; 526/98; 526/99; 526/100
(58) Field of Search .................. 526/107, 129, 526/98, 99, 100

(56) References Cited

U.S. PATENT DOCUMENTS

| | | | | |
|---|---|---|---|---|
| 3,102,877 A | * | 9/1963 | MacKenzie | 526/98 |
| 3,105,066 A | * | 9/1963 | MacKenzie | 526/98 |
| 3,202,645 A | * | 8/1965 | Yancey | 526/129 |
| 3,887,494 A | | 6/1975 | Dietz | 252/452 |
| 4,385,161 A | * | 5/1983 | Caunt et al. | 520/129 |
| 4,526,943 A | | 7/1985 | Fuentes, Jr. | 526/133 |
| 4,560,733 A | | 12/1985 | Martin et al. | 526/129 |
| 4,562,169 A | | 12/1985 | Hagerty et al. | 502/107 |
| 4,568,658 A | | 2/1986 | Cook et al. | 502/107 |
| 4,607,019 A | * | 8/1986 | Bert | 526/129 |
| 4,634,751 A | * | 1/1987 | Bert | 526/129 |
| 4,670,413 A | | 6/1987 | Furtek | 502/120 |
| 4,672,096 A | | 6/1987 | Nowlin | 526/116 |
| 4,707,530 A | * | 11/1987 | Johnson | 526/129 |
| 4,727,049 A | * | 2/1988 | Furuhashi et al. | 526/129 |
| 4,876,229 A | | 10/1989 | Furtek | 502/107 |
| 5,155,078 A | * | 10/1992 | Kioka et al. | 526/124.5 |
| 5,166,281 A | * | 11/1992 | Chamla et al. | 520/129 |
| 5,344,885 A | | 9/1994 | Kersting et al. | 525/245 |
| 5,399,638 A | | 3/1995 | Brun et al. | 526/153 |

FOREIGN PATENT DOCUMENTS

| | | | | |
|---|---|---|---|---|
| EP | 0493118 | | 7/1992 | |
| GB | 950219 | * | 2/1964 | 526/98 |
| GB | 957461 | * | 5/1964 | 526/98 |
| SU | 442192 | | 6/1978 | |
| WO | 9526816 | | 10/1995 | |

OTHER PUBLICATIONS

Polymerisation of Ethylene on the Surface of Diatomites and Other Natural Silica Rocks Activated with an Organoaluminum Compound, W. M. Rudakov, International Polymer Science and Technology, 19, No. 6, 1992.

* cited by examiner

*Primary Examiner*—David W. Wu
*Assistant Examiner*—William K. Cheung
(74) *Attorney, Agent, or Firm*—Robert A. Maggio

(57) ABSTRACT

In accordance with this invention are methods for making the novel compositions and methods of using the compositions for polymerization of olefins. In its broadest form, the method of producing the supported catalytic composition of the present invention comprises treating an inorganic or inorganic oxide support which has incorporated uniformly therein a Group 3–10 transition metal from the Periodic Table with a metal alkylating reagent wherein the reaction product is then treated with a halogenating reagent. The resultant reaction product can be recovered and is available for use in conjunction with the activating co-catalyst for the polymerization of polyolefins.

21 Claims, No Drawings

SUPPORTED CATALYST COMPOSITION FOR POLYMERIZATION OF OLEFINS

BACKGROUND OF INVENTION

This invention relates to a method of producing a supported catalyst component, the catalyst component produced according to the method, to an olefin polymerization supported catalyst composition, and to an olefin polymerization process using such a supported catalyst.

Supported catalysts of the Ziegler or Ziegler-Natta type can be used in the polymerization of olefins in various types of polymerization reaction systems, including high pressure, solution, slurry, and gas phase processes. Different techniques are known for producing supported catalysts. In each of the known techniques the reactive catalytic metal (e.g., titanium) is typically added after preparation of the support. This support is typically a magnesium halide or alkoxide species, or a silica support onto which a magnesium halide or alkoxide is deposited.

For example, U.S. Pat. No. 4,526,943 discloses an olefin polymerization catalyst prepared by the reaction of a hydrocarbon soluble organomagnesium compound with a trialkylaluminum reagent and an aliphatic alcohol to generate a soluble magnesium alkoxide precursor to which a transition metal compound (typically a titanium compound) is added. U.S. Pat. No. 4,560,733 teaches the use of a catalyst system having a titanium coating component made from a milled blend of two different supports, each support being treated with a dihyrocarboxylmagnesium compound, and a halogenated tetravalent titanium compound.

U.S. Pat. Nos. 4,672,096 and 4,670,413 disclose contacting a magnesium compound and the carrier with a transition metal (e.g., titanium or vanadium) compound to produce a supported solid catalyst composition.

With each of these methods the support treated with the organomagnesium halide compound is subsequently treated by the addition of the polymerization active transition metal. These procedures can lead to a less than uniform distribution of polymerization active metal on the catalytic support and can involve difficult handling procedures such as refluxing the catalyst precursors in neat or concentrated solutions of the transition metal reagent until sufficient metal absorption has been achieved. Furthermore, by adding the active metal to the precursor after the precursor is formed, in order to obtain a sufficient quantity of catalytic metal, the active metal salt must often be added in excess requiring the additional step of eliminating the excess afterwards. Failure to remove the excess metal salt can produce soluble polymerization active metal centers that adversely affect slurry and gas phase polymerization processes, i.e., formation of skins or agglomerates.

Accordingly, it is the object of the present invention to overcome these problems and disadvantages by providing an active polymerization catalyst and one that does not require the subsequent addition of the polymerization active transition metal. Moreover, the additional object of the present invention is to eliminate handling and excessive transition metal reagent usage associated with the preparation of the typical Ziegler-Natta catalysts. Furthermore, the present invention converts normally inactive transition metal centers into centers capable of preparing narrow molecular weight distribution olefins such as ethylene or other α-olefins. The present invention also achieves a catalyst that is displays excellent hydrogen response and is capable of producing a range of molelular weight polymers from ultra high molecular weight (zero melt flow) polyethylene to low molecular weight (high melt flow) polyethylene.

SUMMARY OF INVENTION

In accordance with one aspect of the present invention, there is provided novel compositions of matter which are useful for polymerization of olefins by providing a catalyst composition that does not require the additional treatment with the polymerization active transition metal.

Also provided in accordance with this invention are methods for making the novel compositions and methods of using the compositions for polymerization of olefins. In its broadest form, the method of producing the supported catalytic composition of the present invention comprises treating an inorganic support (e.g., gels, co-gel, tergels) which has incorporated therein a Groups 3–10 transition metal from the Periodic Table with a metal alkylating reagent wherein the reaction product is then treated with a halogenating reagent. The resultant reaction product is, optionally, recovered and available for use in conjunction with the activating co-catalyst (a.k.a an activator) for the polymerization of polyolefins.

DETAILED DESCRIPTION OF THE INVENTION

The present invention is directed to a novel method of making active polymerization catalyst compositions and the novel composition provided therefrom. The method of the present invention provides that a supported catalyst component is obtained by:

1) treating a support, preferably calcined and preferably a gel, co-gel or tergel and mixtures thereof, containing at least one Group 3–10 transition metal, preferably an oxide, with an alkylating reagent;

2) treating the reaction product from step one with a halogenating reagent; and, optionally, 3) recovering the reaction product from step 2.

The resulting catalyst is suitable for homo-polymerizing and copolymerizing olefinic monomers and co-monomers, particularly, ethylene and other α-olefins, e.g., propylene, 1-butene, 1-hexene.

The catalysts produced according to the present invention are described below in terms of the manner in which they are made.

The Metal Containing Support Material

The metal containing support can be purchased from suppliers or prepared using known techniques wherein the metal is uniformly distributed throughout the support's structure. For example, U.S. Pat. No. 3,887,494 teaches one method of preparing a $SiO_2$—$TiO_2$ cogel. Any inorganic or inorganic oxide support material containing a metal from the Group 3–10 transitional metals from the Periodic Table can be used in this invention upon mixing with suitable alkylating and halogenating reagents.

Suitable inorganic oxides in the support include talcs, clays $SiO_2$, $Al_2O_3$, MgO, $ZrO_2$, $TiO_2$, $Fe_2O_3$, $B_2O_3$, CaO, ZnO, BaO, $ThO_2$ and mixtures thereof such as silica alumina, silica alumina titania, zeolite, ferrite and glass fibers. Such mixtures include physical and gelled mixtures. In addition, the above-mentioned inorganic oxide carriers may contain a small amount of carbonates, nitrates, sulfates or the like. Additional suitable inorganic oxide materials include aluminum phosphate gel materials and mixtures of two or more of the foregoing.

The transition metal combined with the inorganic or inorganic oxide material describe above, is selected from metals in Groups 3 to 10 of the Periodic Table and preferably in an oxide form of these metals. Most preferred transition metals are oxides from the Groups 3–6 of the Periodic Table. Most preferably are vanadia, zirconia, chromia, and titania and mixtures thereof. The transition metal is from about 0.1 wt. % of the total weight of the support to 100 wt. % of the total weight of the support.

The degree of porosity in the carrier may be any level that is achievable in the starting material. Preferably, the carrier particles of the present invention have a pore volume of at least 0.1 cc/g; preferably from 0.25 to 5 cm$^3$/g; most preferably from about 0.7 to 3.0 cm$^3$/g.

Preferably, the particles have a surface area of about 1–1000 m$^2$/g; preferably from about 25–600 m$^2$/g; more preferably from about 100 to 450 m$^2$/g. The typical median particle size for a suitable co-gel for this invention is from 1 to 300 microns; preferably from 5 to 200 microns; and more preferably from 180 microns.

Pore volume and surface area can be, for example, measured from volume of nitrogen gas adsorbed in accordance with BET method. (Refer to J. Am. chem. Soc., Vol. 60, p. 309 (1983)).

The metal containing support is preferably calcined prior to treatment with the alkylating and halogenating reagents at a temperature in the range of from about 150° C. to 1000° C., for a time of from 1 minute to 24 hours; preferably in the range of about 150° C. to 800° C., for a time of from 1 minute to 6 hours; and more preferably in the range of about 300° C. to 500° C., for a time of from 2 to 6 hours.

The Alkylating Reagent

The alkylating reagent is represented by the formula $M^a R_a$ wherein M is a metal from Group 1, 2 and 13 from the Periodic Table and mixtures thereof and where a is the valence state of the metal; preferably Mg, Zn, Li, Al, Na, and K and mixtures thereof; most preferably Mg, Zn, Al and mixtures thereof.

The R's are the same or independent and are radicals selected from the group consisting of halogens, alkyls, aryls, alkylaryls, arylalkyls, alkoxys and alkenyls, cyclopentadienyl with from 0 to 5 substituents, wherein the substituents may form rings (i.e., indenyl) compounds and mixtures thereof; and wherein at least one R is an alkyl, alkyaryl, arylalkyl or cyclopentadienyl. The number of R's is sufficient to balance the valence state a of the metal.

Preferred are radicals of chlorine, bromine; C1–20 alkenyls (preferably, ethenyl, propylenyl, butenyl, and pentenyl); C1–20 alkyl group (preferably, methyl, ethyl, n-propyl, iso-propyl, n-butyl, n-octyl, and 2-ethylhexyl groups); C1–C20 alkoxys (preferably, ethoxy, propoxy, butoxy); C6–20 aryl groups, alkylaryl groups, (preferably, phenyl, p-tolyl, benzyl, 4-t-butylphenyl, 2,6 dimethylphenyl, 3,5-methylphenyl, 2,4-dimethylphenyl, 2,3-dimethylphenyl groups); C5–C25 cyclopentadienyls (preferably, mono and bis cyclopentadienyl) and mixtures of two or more of the foregoing.

The most preferred alkylating reagents are hydrocarbon soluble dialkylmagnesium compounds, such as dialkylmagnesium, alkylmagnesium alkoxide, alkylmagnesium halide, as well as dialkylzinc, trialkylaluminum and mixtures thereof. Specific examples of the most preferred alkylating agents are diethylzinc, dibutylmagnesium, triethylaluminum, butylethylmagnesium, dibutylmagnesium, butylmagnesium butoxide, butylethylmagnesium butoxide and ethylmagnesium chloride.

The amount of the alkylating agent used in the present invention is measured in mmole of metal in the alkylating agent to gram of transition metal containing support. Preferably, the ratio of these reagents is at least 0.1 mmole of alkylating agent per one gram of support; preferably the ratio is from about 1 mmole/gram to 5 mmole/gram; and most preferably, the ratio is from about 2 mmole/gram to 3 mmole/gram.

The Halogenating Reagent

The halogenating reagent used in the present invention is represented by the formula $R'''X_n$ wherein X is a monovalent radical selected from among the halogens or mixtures thereof; preferably chlorine, fluorine, bromine and mixtures thereof. The R is a radical that is selected from the group consisting of H and hydrocarbon radicals selected from the group consisting of C7–20 alkylaryls (such as benzyl and 4-methylbenzyl); C1–C20 alkyl, preferably, C1–C10 alkyls; and more preferably methyl, ethyl, n-propyl, iso-propyl, n-butyl, t-butyl, n-octyl, and 2-ethylhexyl groups; and other radicals selected from the group consisting of boron; organic acids, preferably benzyl acids and acetic acids, most preferably phthalic acid; phosphorus; thionyl; sulfuryl; carbonyl, preferably phosgenes; nitrosyl; silicon; alkylsilicon; aluminum; alkylaluminum; ammonium silicates and mixtures thereof, wherein m is the valence of R and m=n. Furthermore, R can be zero, e.g., where the halogenating agent is chlorine or bromine.

Preferred halogenating agents are diethylaluminumchloride, trimethylchlorosilane, t-butylchloride, boron trichloride, aluminum trichloride, ammonium hexafluororsilicate, thionyl chloride, sulfuryl chloride, phosgene, nitrosyl chloride, chlorine, bromine, silicon chloride and mixtures thereof; most preferred are chlorinating agents, with BCl$_3$ and trimethylchlorosilane and mixtures thereof being even more preferred.

The halogenating reagent should be used in a quantity that provides halogens in an amount of from about 2 to 10 times the molar amount of the alkylating reagent present in the support. The most preferred amount is from about 4 to about 8 times the amount of alkylating reagent; and the even more preferred is approximately 6 times.

Method of the Catalyst Composition

The method of producing the catalyst according to the present invention comprises the steps:

1) combining the support as described containing a Group 3–10 transitional metal, with an alkylating reagent as herein defined, in dry degassed solvents such as ethers, aromatics, aliphatics and mixtures thereof; preferably in non-coordinating, aliphatic solvents, preferably C5–C8 solvents, such as heptanes, pentanes, and hexane;

2) combining the reaction product of step 1) with a halogenating reagent as defined above.

The combining of these ingredients is carried at temperatures ranging from –30° C. to the boiling point of the solvent used, preferably from about 0° C. to about 130° C., and most preferably between room temperature and about 50° C. Some halogenating reagents may require temperature above room temperature to form the desired catalyst.

Method of Using the Catalyst Compositions

Activation of the supported catalysts or catalytic systems of the present invention may be accomplished by any suitable method for bringing the support and/or the supported catalyst into contact with an appropriate catalytic activator, such as an organoaluminum compound, to create the active catalytic species. Such mixing techniques include the mixing of the dry powders, through gaseous impregnation or via a slurry composition in a solvent.

The catalytic activator includes those represented by the formula $R^4{}_n AlX_{3-n}$ where $R^4$ is a hydrocarbon radical having from 1 to about 20 carbon atoms, X is monovalent radical selected from the halogens and hydrogen, and n is an integer of 0–3. Examples of specific compounds include trimethylaluminum, triisobutylaluminum, tridodecylaluminum, tricyclohexyaluminum, triphenylaluminum, tribenzylaluminum, diethylaluminum chloride, ethylaluminum dichloride, isopropylaluminum dibromide, diisobutylaluminum hydride, and the like, and mixtures thereof.

The catalytic activator also includes alumoxanes such as methylaluminoxane, isobutylaluminoxane.

The activated catalyst is useful to polymerize olefinic materials, particularly ethylene. Polmerizations of olefinic monomers can be accomplished by any number of well known techniques by having the olefinic material come into contact with the polymerization catalyst(s) in a reaction zone under appropriate conditions.

As used herein, "Polymerization" includes copolymerization and terpolymerization and the terms olefins and olefinic monomer includes olefins, alpha-olefins, diolefins, strained cyclic olefins, styrenic monomers, acetylenically unsaturated monomers, cyclic olefins alone or in combination with other unsaturated monomers. While the catalyst system of the present invention is active for this broad range of olefinic monomer feedstock, alpha-olefin polymerizations is preferred, especially the homopolymerization of ethylene and propylene or the copolymerization of ethylene with olefins having 3 to 10 carbon atoms.

"Polymerization techniques" for olefin polymerization according to the present invention can be solution polymerization, slurry polymerization or gas phase polymerization techniques. Method and apparatus for effecting such polymerization reactions are well known and described in, for example, Encyclopedia of Polymer Science and Engineering published by John Wiley and Sons, 1987, Volume 7, pages 480–488 and 1988, Volume 12, pages 504–541. The catalyst according to the present invention can be used in similar amounts and under similar conditions to known olefin polymerization catalyst.

Typically, for the slurry process, the temperature is from approximately 0 degrees C. to just below the temperature at which the polymer becomes soluble in the polymerization medium. For the gas phase process, the temperature is from approximately 0 degrees C. to just below the melting point of the polymer. For the solution process, the temperature is typically the temperature from which the polymer is soluble in the reaction medium up to approximately 275 degrees C.

The pressure used can be selected from a relatively wide range of suitable pressures, e.g., from subatmospheric to about 350 Mpa. Suitably, the pressure is from atmospheric to about 6.9 Mpa, or 0.05–10 MPa, especially 0.14–5.5 Mpa. In the slurry or particle form process, the process is suitably performed with a liquid inert diluent such as a saturated aliphatic hydrocarbon. Suitably the hydrocarbon is a $C_4$ to $C_{10}$ hydrocarbon, e.g., isobutane, heptane or an aromatic hydrocarbon liquid such as benzene, toluene or xylene. The polymer is recovered directly from the gas phase process or by filtration or evaporation from the slurry process or evaporation from the solution process.

The catalyst of the present invention are particularly suited for the gas phase or slurry process.

The compositions according to the present invention are used in a amounts sufficient to cause polymerization in the feedstocks. Typically, the amount used will be in the range of 0.0005 mmole to 10 mmole/liter of reactor; most preferably from 0.01 mmole to 2.5 mmole/liter of reactor.

In addition to the examples of the present invention provided in the examples and in the samples in Tables I–IV below, preferred catalyst can be prepared from the following starting materials.

| SUPPORT CONTAINING TRANSITION METAL | ALKYLATING REAGENT | HALOGENATING REAGENT |
|---|---|---|
| Si—Ti cogel | diethylzinc | BCl3 |
| Si—Zr cogel | dibutylmagnesium | SiCl4 |
| Si—V cogel | triethyl aluminum | thionyl chloride |
| Si—Ti—Cr tergel | butylethyl magnesium | BCl3 |
| Titania | dibutyl magnesium | BBr3 |
| Si—Al—Ti tergel | butylmagnesium butoxide | timethylsilyl chloride |
| AlPO4—Ti coqel | butylethylmagnesium | NH4SiF6 |
| Si—Ti cogel | ethylmagnesium chloride | benzoyl chloride |
| MgO—V—Cr | triethylaluminum | Hcl |
| Fe2O3—Ti | NaCp | AlCl3 |
| B2O3—V | Cp2Mg | HCl |
| CaO—Cr | BEM | thionylchloride |
| CaO—ZrO2—Ti—Cr | BuLi | PCl5 |
| BaO—MgO—Co | EtMgCl | TMSCl |
| ThO2—SiO2—Mo | trioctylaluminum | BCl3 |
| SiO2—Al2O3—Cr | EtMgCl | TMSCL |
| Al2O3—AlPO4—Ti | BEM | BCl3 |

EXAMPLES

The silica-titania cogel used is the preparations below was calcined at 500° C. for 4 hours and stored under an inert atmosphere. Analysis of support: 2.34 wt. % Ti; 0.14 wt. % C; 0.06 wt. % Cl; surface area=430 $m^2/g$, pore volume=2.55 cc/g, 164 micron average particle size. Schlenk and glove box techniques are used throughout to exclude water and oxygen. All solvents are thoroughly dried and degassed prior to use.

Example 1

Calcined cogel (20.0 g) is slurried in 300 ml of pentane and treated with 34.0 ml of 1.0 M dibutylmagnesium in heptane (34.0 mmol), slowly with stirring. The support slurry becomes dark brown after complete addition; stirring was continued for 30 minutes. The brown support is treated (dropwise with stirring) with 22.2 ml (204 mmol) of 2-chloro-2-methylpropane, resulting in a slight exotherm. Stirring is continued for 1 hour at room temperature. The product is filtered and washed three times with 100 ml of pentane and dried under vacuum for three hours at room temperature.

Elemental analysis: 3.35 wt. % Mg; 9.0 wt. % Cl; 2.21 wt. % Ti; 2.06 wt. % C.

Example 2

Calcined cogel (20.0 g) is slurried in 300 ml of pentane and treated with 34.0 ml of 1.0 M dibutylmagnesium in heptane (34.0 mmol), slowly with stirring. The support slurry becomes dark brown after complete addition; stirring is continued for 30 minutes. The slurry is treated with 17.0 ml of chlorotrimethylsilane followed by dropwise addition of 34.0 ml of 1.0 M $BCl_3$ (34.0 mmole) in heptane. A mild exotherm results from the addition of $BCl_3$. The catalyst slurry is stirred for 30 minutes, collected on a fritted funnel, washed with 2×100 ml of pentane and dried under vacuum. Elemental analysis: 3.58 wt. % Mg; 12.77 wt. % Cl; 2.19 wt. % Ti; 1.91 wt. % C.

Example 3

Calcined cogel (20.0 g) is slurried in 300 ml of pentane and treated with 34.0 ml of 1.0 M dibutylmagnesium (34 mmole) in heptane, slowly with stirring. The resulting brown slurry is stirred for 1 hour at room temperature, filtered, washed with 2×100 ml of pentane and dried under vacuum. Elemental analysis: 3.71 wt. % Mg; 0.0 wt. % Cl; 2.25 wt. % Ti; 3.81 wt. % C.

Example 4

Calcined cogel (10.0 g) is slurried in 300 ml of pentane and treated with 34.0 ml of 1.0 M dibutylmagnesium 34.0 mmole in heptane, slowly with stirring. The support slurry becomes dark brown after complete addition; stirring is continued for 30 minutes. The slurry is slowly treated with 34.0 ml of 1.0 M BCl$_3$ (34.0 mmole) in heptane. A mild exotherm results from the addition of BCl$_3$. The catalyst slurry is stirred for 30 minutes, collected on a fritted funnel, washed with 2×100 ml of pentane and dried under vacuum. Elemental analysis: 6.63 wt. % Mg; 17.05 wt. % Cl; 1.98 wt. % Ti; 2.32 wt. % C.

Example 5

Calcined cogel (10.0 g) is slurried in 300 ml of pentane and treated with 17.0 ml of 1.0 M BCl$_3$ (17.0 mmole) in heptane. The catalyst slurry is stirred for 1 hour, collected on a fritted funnel, washed with 2×100 ml of pentane and dried under vacuum. Elemental analysis: 3.80 wt. % Cl; 1.50 wt. % Ti.

Example 6

Calcined cogel (10.0 g) is slurried in 300 ml of pentane and treated with 11.0 ml of 1.6 M butyllithium (17.0 mmole) in heptane, slowly with stirring. The support slurry became dark brown after complete addition; stirring is continued for 30 minutes. The slurry is treated 17.0 ml of 1.0 M BCl$_3$ (17.0 mmol) in heptane. The catalyst slurry is stirred for 30 minutes, collected on a fritted funnel, washed with 2×100 ml of pentane and dried under vacuum. Elemental analysis: 1.09 wt. % Li; wt. % Cl; 2.19 wt. % Ti; 1.91 wt. % C.

Example 7

Ten grams of the material prepared in Example 2 is treated with 1.0 ml of a 1.8 M solution of TiCl$_4$ in heptane. The mixture is stirred for 30 minutes, filtered, washed with 2×50 ml of pentane, and dried under vacuum. Elemental analysis: 2.84 wt. % Mg; 13.3 wt. % Cl; 2.0 wt. % Ti.

Polymerizations are conducted in glass bottles at 45° C., 40 psig ethylene. The glass bottles are immersed in a thermoregulated water bath set to 45° C. For each catalyst example given above, 100 mg of each catalyst is slurried in 150 ml of dry heptane and treated with 2.0 ml of a heptane solution (1.39 wt. % Al) of triethylaluminum. Polymerizations are conducted for 1 hour and the polymer formed are washed with acetone and dried overnight under vacuum. Activities (in units of kg polymer produced/mmol Ti-hr) are listed in the last column of Table I.

THE TABLES

Table I provides the chemical analysis of the catalyst formed from Examples 1–7 described above as well as providing the polymerization activity at low temperature and low pressure. Examples 1, 2, and 4 are examples of the present invention. Examples 3 and 6 illustrate that using an alkylating reagent or a halogenating reagent alone, respectively, do not produce an active catalyst.

Example 6 in Table 1 shows that the use of BuLi as an alkylating agent yields a catalyst of low activity Example 7 in Table 1 illustrates that the addition of Ti in excess after the formation of the catalyst does not significantly improve activity.

Tables IIA–IIC provides a comparative analysis of catalysts prepared from various supports, alkylating and halogenation agents. Table IIA provides the information regarding the starting materials. All catalysts were prepared in a manner similar to Example 2 above. Table IIB provides the polymerization data and Table IIC provides information on the polymer obtained. The polymers were obtained under the conditions outlined in Table IIB using a 2-liter Zipperclave reactor (constant temperature and pressure).

Table IIIA–IIIC provides a comparative analysis of catalysts prepared using various alkylating and halogenation reagents on the same support. Table IIIA provides the information regarding the starting materials. All catalysts were prepared in a manner similar to Example 2 above. Table IIIB provides the polymerization data and Table IIIC provides information on the polymer obtained. The polymers were obtained under the conditions outlined in Table IIIB using a 2-liter Zipperclave reactor at constant temperature and pressure.

Tables IVA & B illustrates the hydrogen response that the catalyst of the present invention exhibits. The catalyst of the present invention can produce a wide range of polymer melt flow values depending on the hydrogen/ethylene ratio. The melt flow ratio remains essentially constant over this wide melt flow range. Catalyst activity remains acceptable even at high hydrogen/ethylene ratios.

As reagents are introduced the abbreviations are explained. Like abbreviations refer to like compounds or reagents.

TABLE I

RESULTS FROM EXAMPLES 1–7

| EXAMPLE | ALKYLATING AGENT | HALO-GENATION AGENT | WT. % MgO | WT. % Cl | WT. % Li2O | WT. % TiO2 | WT. % C | ACTIVITY Kg/MMOL TiHr* |
|---|---|---|---|---|---|---|---|---|
| 1 | Di-BuMg | t-BuCl | 5.55 | 9 | 0 | 3.69 | 2.06 | 0.13 |
| 2 | Di-BuMg | BCl3/TMSCL | 5.93 | 12.77 | 0 | 3.66 | 1.91 | 0.46 |
| 3 | Di-BuMg | NONE | 6.16 | 0.08 | 0 | 3.76 | 3.81 | 0.006 |
| 4 | Di-BuMg | BCl3 | 10.99 | 17.05 | 0 | 3.311 | 2.32 | 0.39 |
| 5 | NONE | BCl3 | 0 | 3.8 | 0 | 2.497 | 0.17 | 0 |
| 6 | BuLi | BCl3 | 0 | 10.77 | 2.35 | 3.58 | 2.44 | 0.07 |
| 7 | Di-BuMg | BCl3/TMSCl & TiCl4 | 4.71 | 13.3 | 0 | 3.39 | 0 | 0.51 |

*Low Pressure/Low temperature Polymerization
Di-BuMg = dibutyl magnesium
t-BuCl = t-butylchloride
BuLi = butyllithium
TiCl$_4$ = titanium tetrachloride
TMSCl = trimethylchlorosilane
BCl$_3$ = Boron trichloride

TABLE II A

POLYMERIZATION DATA THE CATALYST

| SAMPLE | SUPPORT EXAMPLE Si—Ti Cogel* | ALKYLATING** AGENT, amount | HALOGENATING** AGENT, amount |
|---|---|---|---|
| 8  | a | Di-BuMg, 2.0 | BCl3, 2.0 |
| 9  | b | BEM, 1.9 | BCl3, 2.0 |
| 10 | b | BEM, 1.9 | BCL3, 2.0 |
| 11 | c | BEM, 1.9 | BCl3, 2.0 |
| 12 | b | BEM, 1.9 | EADC, 1.9 |
| 13 | d | BEM, 2.3 | BCl3, 2.4 |
| 14 | e | BEM, 1.9 | BCl3, 2.0 |

BEM = butylethyl magnesium
EADC = ethylaluminum dichloride
BCl3 = Boron trichloride
*All supports were calcined at 500° C. for 4 hours.
a = SA of 389 $m^2/g$; PV of 2.16 cc/g; and 5.88 WT. % $TiO_2$.
b = SA of 321 $m^2/g$; PV of 0.97 cc/g; and 4.07 WT. % $TiO_2$.
c = SA of 411 $m^2/g$; PV of 1.14 cc/g; and 4.53 WT. % $TiO_2$.
d = SA of 310 $m^2/g$; PV of 1.17 cc/g; and 4.33 WT. % $TiO_2$.
e = SA of 421 $m^2/g$; PV of 2.48 cc/g; and 3.82 WT. % $TiO_2$.
**mmole of reagent/gram of support

TABLE II B

POLYMERIZATION

| SAMPLE FROM IIA | MG CAT. | ML.* COCAT. | TEMP. ° C. | H2 PSIG | C2 PSIG | STIR RATE (RPM) | TIME (HR) | YIELD (G) |
|---|---|---|---|---|---|---|---|---|
| 8  | 100 | 5   | 75 | 60 | 120 | 500 | 1    | 79 |
| 9  | 102 | 5   | 75 | 31 | 149 | 500 | 1.1  | 170 |
| 10 | 50  | 2.5 | 75 | 60 | 120 | 500 | 1.07 | 65 |
| 11 | 100 | 5   | 75 | 60 | 120 | 500 | 1    | 96 |
| 12 | 100 | 5   | 75 | 30 | 150 | 500 | 1    | 25.2 |
| 13 | 100 | 5   | 75 | 60 | 120 | 500 | 1.2  | 116 |
| 14 | 101 | 5   | 75 | 30 | 150 | 500 | 1    | 128 |

*Co-catalyst = 24.5 wt. % Triisobutylaluminum

TABLE II C

POLYMER CHARACTERIZATION

| SAMPLE FROM II A | ACTIVITY | MELT INDEX | HLMI | MFR |
|---|---|---|---|---|
| 8  | 790  | 4.7  | Too high | — |
| 9  | 1550 | 0.43 | 15.91  | 37 |
| 10 | 1220 | 2.9  | 82.84  | 28.6 |
| 11 | 960  | 4.9  | 117.49 | 23.98 |
| 12 | 250  | 2.2  | 72.16  | 32.8 |
| 13 | 970  | 3.1  | 117.9  | 38.0 |
| 14 | 1270 | 0.64 | 21.62  | 33.8 |

MI = Melt Index (ASTM Procedure 1238, Condition E)
HLMI = High Load Melt Index (ASTM Procedure 1238, Condition F)
MFR = Melt Flow Ratio (ASTM Procedure 1238)

TABLE IIIA

EFFECT OF CHLORINATING AND ALKYLATING AGENTS POLYMERIZATION THE CATALYST

| SAMPLE* | ALKYLATING AGENT, amount** | HALOGENATING AGENT, amount** |
|---|---|---|
| 15 | MgBu2, 2.0 | BCl3, 2.0 & DEAC, 2.0 |
| 16 | MgBu2, 1.7 | TMSCl, 6.7 & BCl3, 1.7 |
| 17 | BEM, 1.9   | BCL3, 2.0 |
| 18 | MgBu2, 1.7 | TMSCl, 6.7 & BCl3, 1.7 |
| 19 | BEM, 1.9   | TMSCl, 7.0 & BCl3, 2.0 |
| 20 | BEM, 1.9   | BCl3, 4.0 |
| 21 | BEM, 1.9   | BCl3, 4.0 |
| 22 | BEM, 1.9   | EADC, 2.0 |

DEAC = Diethyl aluminum chloride
*The support used in these samples are all $SiO_2.TiO_2$ calcined at 500° C. having a SA of 421 $m^2/g$, PV of 2.48 cc/g, APS of 164 m and wherein TiO2 is 3.825 wt. %
**mmole of reagent/gram support

TABLE IIIB

POLYMERIZATION

| SAMPLE FROM IIA | MG CAT. | ML.* COCAT. | TEMP. °C. | H2 PSIG | C2 PSIG | STIR RATE (RPM) | TIME (HR) | YIELD (G) |
|---|---|---|---|---|---|---|---|---|
| 15 | 100 | 5 | 75 | 60 | 120 | 500 | 1 | 31.5 |
| 16 | 100 | 5 | 75 | 60 | 120 | 500 | 1 | 120 |
| 17 | 100 | 5 | 75 | 30 | 150 | 500 | 0.95 | 86.8 |
| 18 | 101 | 5 | 75 | 30 | 150 | 500 | 1 | 211 |
| 19 | 100 | 5 | 75 | 30 | 150 | 500 | 1 | 193 |
| 20 | 100 | 5 | 75 | 30 | 150 | 500 | 1 | 117 |
| 21 | 100 | 5 | 75 | 60 | 120 | 500 | 1 | 103 |
| 22 | 102 | 5 | 75 | 60 | 120 | 500 | 1 | 12 |

*Co-catalyst = 24.5 wt. % Triisobutylaluminum

TABLE III C

POLYMER CHARACTERIZATION

| SAMPLE FROM III A | ACTIVITY | MELT INDEX | HLMI | MFR |
|---|---|---|---|---|
| 15 | 315 | 2.5 | 108 | 43.2 |
| 16 | 1200 | 7.5 | Too high | — |
| 17 | 910 | 0.72 | 24.71 | 34.3 |
| 18 | 2080 | 0.69 | 22.15 | 32 |
| 19 | 1930 | 0.65 | 21.36 | 32.86 |
| 20 | 1760 | 0.74 | 20.43 | 27.6 |
| 21 | 1030 | 7.3 | Too high | — |
| 22 | 120 | 5.5 | Too high | — |

TABLE IV

HYDROGEN RESPONSE ALL USING EXAMPLE 2 FROM TABLE I

| SAMPLE | MG CAT. | ML.* COCAT. | TEMP. °C. | H2 PSIG | C2 PSIG | STIR RATE (RPM) | TIME (HR) | YIELD (G) |
|---|---|---|---|---|---|---|---|---|
| 23 | 51.2 | 2.5 | 75 | 0 | 200 | 500 | 1 | 209 |
| 24 | 100 | 5 | 75 | 0 | 120 | 500 | 1 | 191 |
| 25 | 100 | 5 | 75 | 10 | 170 | 500 | 0.87 | 197 |
| 26 | 100 | 5 | 75 | 20 | 160 | 500 | 1.06 | 208 |
| 27 | 101 | 5 | 75 | 30 | 150 | 500 | 1 | 211 |
| 28 | 101 | 5 | 75 | 30 | 150 | 500 | 1 | 164 |
| 29 | 100 | 5 | 75 | 40 | 150 | 500 | 1 | 163 |
| 30 | 100 | 5 | 75 | 50 | 120 | 500 | 1 | 149 |
| 31 | 102 | 5 | 75 | 60 | 120 | 500 | 1 | 120 |

*Co-catalyst = 24.5 wt. % Triisobutylaluminum

TABLE IV B

POLYMER CHARACTERIZATION

| SAMPLE FROM IV A | ACTIVITY | MELT INDEX | HLMI | MFR |
|---|---|---|---|---|
| 23 | 4100 | 0 | 0 | — |
| 24 | 1910 | 0 | 0 | — |
| 25 | 2260 | 0 | 2.5 | — |
| 26 | 1960 | 0.22 | 7.22 | 32.8 |
| 27 | 2080 | 0.69 | 22.15 | 32 |
| 28 | 1640 | 0.65 | 21.57 | 32.2 |
| 29 | 1630 | 1.65 | 55.92 | 33.9 |
| 30 | 1490 | 3.3 | 109.34 | 33.1 |
| 31 | 1200 | 7.5 | Too high | — |

What is claimed is:

1. A method of producing a supported transition metal containing catalyst suitable for polymerizing olefinic materials, said method consisting essentially of the steps of:
   (a) treating a support containing (i) at least one metal and (ii) at least one metal oxide, wherein the metal of each (i) and (ii) is selected from the group consisting of Group 3–10 transition metals and the metal in (i) is distributed throughout the support with an alkylating reagent; and
   (b) treating the reaction product from (a) with a halogenating reagent having the formula $R^m X_n$ wherein X is radical selected from the group consisting of chlorine, fluorine, bromine and mixtures thereof and R is a radical selected from the group consisting of H, $C_{6-26}$ aryls, $C_{6-20}$ arylalkyls, $C_{6-20}$ alkylaryls, $C_{1-20}$ alkyl, boron, organic acids, phosphorus, thionyl, sulfuryl, carbonyl, nitrosyl, silicon, alkylsilicon, aluminum, alkylaluminum, ammonium silicates and mixtures thereof, wherein m is the valence of R and m=n and wherein R can be absent.

2. The method according to claim 1, wherein the method further comprises using a transition metal containing support selected from the group consisting of a calcined inorganic or inorganic oxide, co-gel, tergel and mixtures thereof.

3. The method according to claim 1, wherein the method further comprises the step of treating the transition metal containing support with the alkylating and halogenating reagents in a dry degassed solvent.

4. The method according to claim 3, wherein the method further comprises the step of treating the transition metal containing support with the alkylating and halogenating reagents at a temperature ranging from 30° C. to the boiling point of the solvent used.

5. The method according to claim 4, wherein the method further comprises the step of treating the transition metal containing support with the alkylating and halogenating reagents at a temperature of from room temperature to about 50° C.

6. The method according to claim 5, wherein the method further comprises the step of treating the transition metal containing support with the alkylating and halogenating reagents in a solvent selected from ethers, aromatics, aliphatic solvents and mixtures thereof.

7. The method according to claim 5, wherein the method further comprises the step of treating the transition metal containing support with the alkylating and halogenating reagents in an aliphatic solvent.

8. The method according to claim 5, wherein the method further comprises the step of treating the transition metal containing support with the alkylating and halogenating reagents in a C5–C8 aliphatic solvent.

9. The method according to claim 2, wherein the method further comprises using a support selected from the group consisting of $SiO_2$, $Al_2O_3$, MgO, $ZrO_2$, $TiO_2$, $Fe_2O_3$, $B_2O_3$, CaO, ZnO, BaO, $ThO_2$, $AlPO_4$ zeolite, glass fibers and mixtures thereof and further containing a transition metal oxide selected from the group comprising vanadia, zirconia, chromia, titania and mixtures thereof.

10. The method according to claim 9, wherein the method further comprises using a support selected from the group consisting of comprising silica, alumina, silica-titania, silica-alumina-titania, zeolite, ferrite and glass fibers and mixtures thereof.

11. The method according to claim 1, wherein the method further comprises the step of using an alkylating reagent represented by the formula the formula $M^a R_a$ wherein M is a metal from the group consisting of Group 1, 2 and 13 from the Periodic Table and mixtures thereof and a is the valence state of the metal; and the R's are the same or different independent radicals and are selected from the group consisting of halogens, alkyls, aryls, alkylaryls, alkoxys and alkenyls and cyclopentadienyl compounds and mixtures thereof, wherein at least one R is an alkyl, alkyaryl, aryl, or cyclopentadienyl.

12. The method according to claim 11, wherein the method further comprises using an reagent wherein $M^a$ is selected from the group consisting of Mg, Zn, Li, Al, Na, K and mixtures thereof and the R's are radicals selected from the group consisting of chlorine, bromine, C1–20 alkenyls, C1–20 alkyls, C1–C20 alkoxys, C6–20 aryls, C6–20 alkylaryls, C6–20 arylalkyls, C5–C25 cyclopentadienyls and mixtures thereof.

13. The method according to claim 12, wherein the method further comprises using the step of using a alkylating reagent selected from the group consisting of diethylzinc, dibutylmagnesium, triethylaluminum, butylethylmagnesium, dibutylmagnesium, butylmagnesium butoxide, ethylmagnesium, butoxide and ethylmagnesium chloride and mixture thereof.

14. The method according to claim 1, wherein the method further comprises using an alkylating reagent in an amount of at least 0.1 mmole of alkylating agent per one gram of support.

15. The method according to claim 14, wherein the method further comprises using an alkylating reagent in an amount of alkylating reagent from about 1 mmole/gram of support to 5 mmole/gram of support.

16. The method according to claim 15, wherein the method further comprises using an alkylating reagent in an amount of alkylating reagent from about 2 mmole/gram of support to 3 mmole/gram of support.

17. The method according to claim 1 wherein the method further comprises using a halogenation reagent having selected from the group consisting of diethyl-aluminumchloride, trimethylchlorosilane chloride, t-butylchloride, boron trichloride, aluminum trichloride, ammonium hexafluororsilicate, thionyl chloride, sulfuryl chloride, phosgene, nitrosyl chloride, chlorine, bromine silicon chloride and mixtures thereof.

18. The method according to claim 17 wherein the method further comprises using a halogenation reagent wherein the halogenating reagent is used in a quantity that provides halogens in an amount of from about 2 to 10 times the molar amount of the alkylating reagent present in the support.

19. The method according to claim 18 wherein the method further comprises using a halogenation reagent wherein the halogenating reagent is used in a quantity that provides halogens in an amount of from about 4 to about 8 times the amount of alkylating reagent.

20. A catalytic composition formed by any of the methods of claims 2, 9 or 19.

21. A method of producing a supported transition metal containing catalyst suitable for polymerizing olefinic materials, said method consisting essentially of the steps of:

(a) treating a support with a alkylating reagent wherein the support contains at least one metal oxide, wherein the metal therein is selected from the group consisting of Group 3–10 transition metals and the transition metal is distributed throughout the support; and (b) treating the reaction product from (a) with a halogenating reagent having the formula $R^m X_n$ wherein X is radical selected from the group consisting of chlorine, fluorine, bromine and mixtures thereof and R is a radical selected from the group consisting of H, $C_{6-26}$ aryls, $C_{6-20}$ arylalkyls, $C_{6-20}$ alkylaryls, $C_{1-20}$ alkyl, boron, organic acids, phosphorus, thionyl, sulfuryl, carbonyl, nitrosyl, silicon, alkylsilicon, aluminum, alkylaluminum, ammonium silicates and mixtures thereof, wherein m is the valence of R and m=n and wherein R can be absent.

* * * * *

UNITED STATES PATENT AND TRADEMARK OFFICE
CERTIFICATE OF CORRECTION

PATENT NO. : 6,489,410 B1
DATED : December 3, 2002
INVENTOR(S) : Carney et al.

It is certified that error appears in the above-identified patent and that said Letters Patent is hereby corrected as shown below:

<u>Column 13,</u>
Line 27, delete "comprising".

<u>Column 14,</u>
Line 31, delete "19" and insert -- 10 --.

Signed and Sealed this

Fifteenth Day of July, 2003

JAMES E. ROGAN
*Director of the United States Patent and Trademark Office*